United States Patent

Chilton et al.

[15] 3,642,453
[45] Feb. 15, 1972

[54] PROCESS FOR THE PRODUCTION OF FINELY DIVIDED SILICA

[72] Inventors: Henry Thomas Joseph Chilton, Llangollen, Wales; David Anthony Everest, Middlesex; Ian George Sayce, Teddington, Middlesex, both of England

[73] Assignee: Monsanto Chemicals Limited, London, England

[22] Filed: Aug. 8, 1969

[21] Appl. No.: 848,659

[30] Foreign Application Priority Data

Aug. 13, 1968  Great Britain......................38,674/68

[52] U.S. Cl..................................23/294, 23/182, 204/164, 23/277, 108/288 B
[51] Int. Cl. .....................................................C01b 33/18
[58] Field of Search....................23/182, 293, 294; 204/192, 204/164

[56] References Cited

UNITED STATES PATENTS

| | | | |
|---|---|---|---|
| 3,491,015 | 1/1970 | Naff | 204/192 |
| 3,227,642 | 1/1966 | Lemelson | 204/168 |
| 3,533,756 | 10/1970 | Housemann | 23/294 |

FOREIGN PATENTS OR APPLICATIONS

| | | | |
|---|---|---|---|
| 6,716,765 | 6/1968 | Netherlands | 23/182 |
| 6,716,766 | 6/1968 | Netherlands | 23/182 |

Primary Examiner—Edward Stern
Attorney—Richard W. Sternberg and Roger R. Jones

[57] ABSTRACT

A stream of hot gas from a plasma generator is contacted with a surface of a body comprising silica to form a molten zone from which evaporation of silica occurs into the gas stream, the stream is subsequently quenched by the introduction of cooling gas, and silica in finely divided form is separated from the stream.

4 Claims, 1 Drawing Figure

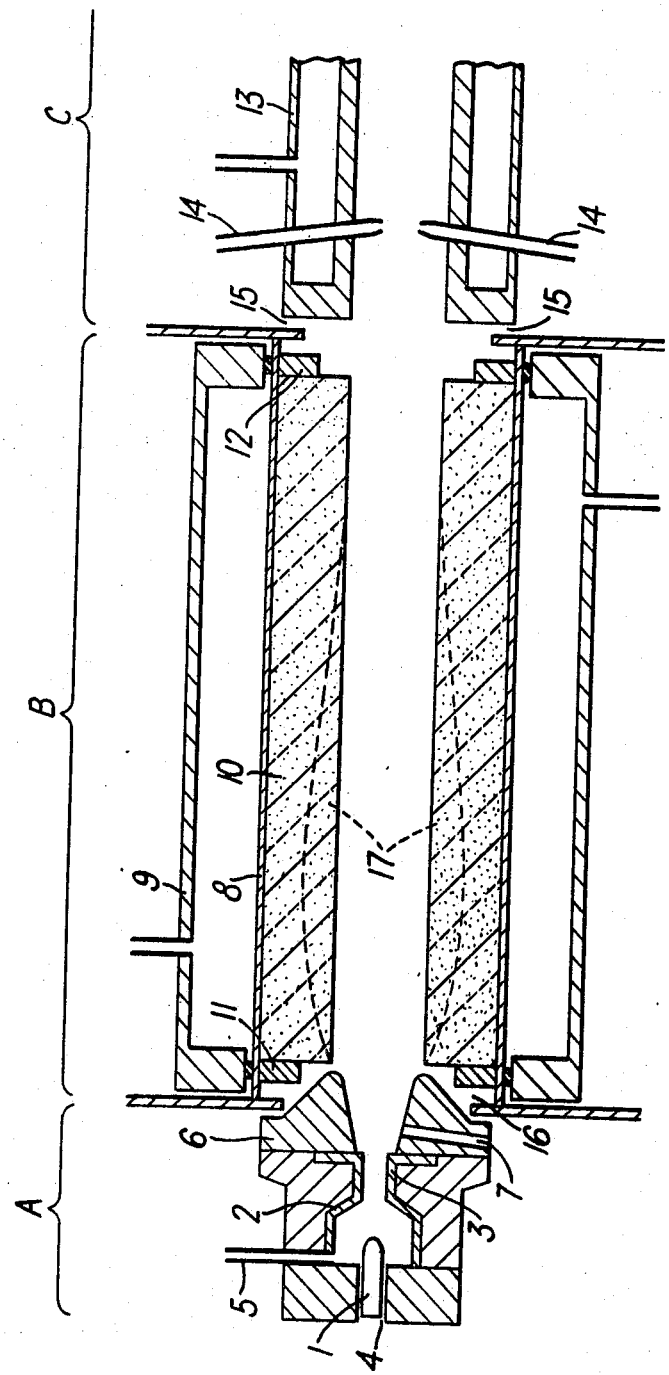
Inventors
Henry Thomas Joseph Chilton
David Anthony Everest
Ian George Sayce
By
Attorney

PROCESS FOR THE PRODUCTION OF FINELY DIVIDED SILICA

This invention relates to a process for the production of silica in finely divided form, more particularly to a process for the production of finely divided silica having improved surface properties.

Finely divided silica has found many industrial applications, including, for example, use as a pigment, a filler for rubbers and plastics, and as a thickening agent for liquid organic resins. The principal methods used hitherto for the production of finely divided silicas, based either on the hydrolysis of sodium silicate or the oxidation of silicon halides having various disadvantages, and the possibility of vaporizing cheap naturally occurring forms of silica and precipitating silica in finely divided form from the vapor has been considered as a potentially better method. Hitherto, however, the silicas produced by vaporization and precipitation have lacked the properties required for certain applications.

We have now found that these deficiencies can be overcome by evaporating the silica at the high temperatures obtainable with a plasma torch and by controlling the conditions under which precipitation occurs. In particular we are able to produce silica that is very effective as a thickening and thixotropic agent in organic liquids such as, for instance, polyester resins.

The process of the invention is one for the production of silica in finely divided form, in which a stream of hot gas from a plasma generator is contacted with a surface of a body of material of which at least a layer at the said surface comprises silica thus forming a molten zone of silica from which evaporation of silica occurs into the gas stream, the stream is subsequently quenched by the introduction of cooling gas, and silica in finely divided form is separated from the stream.

A form of body from which high rates of evaporation can be obtained is one having an axially extending, open-ended passage wherein at least a lining to the passage comprises silica and the body is axially symmetrical. The usual form of such a body is an open-ended cylinder. The stream of hot gas from the plasma generator, at a sufficiently high temperature to melt the silica, is directed into the passage thereby forming a molten zone along the walls of the passage, which zone can be held in place by centrifugal force on rotation of the body about the axis.

The body may have a substantially uniform composition throughout or may be a composite structure having an inner layer (i.e., the lining of the passage) formed of silica and an outer sheath of some more refractory material such as zirconia. The body is preferably mounted for rotation in a water-cooled metal housing.

Effective quenching of the hot gas usually requires that the cooling gas should be introduced at a flow rate at least half the flow rate of the hot gas stream, and in fact the dilution factor can advantageously be taken to the limit of the capabilities of the condenser system to handle the increased volume of gas. For example, the flow rate of the cooling gas can advantageously be from 10 to 20 times that of the hot gas.

A preferred aspect of the process is that the silica is condensed in the presence of water vapor, the latter being preferably introduced into or generated in the gas stream immediately following the exit from the vaporization zone.

The rate of evaporation of the silica is increased by the presence of a reducing agent. This follows from the fact that in the vapor phase, silica is in equilibrium with silicon monoxide and oxygen:

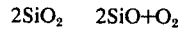

and the removal of the oxygen by combination with the reducing agent results in the equilibrium being shifted to the right. A preferred way of applying this principle is to use a plasma containing a reducing gas, for example, hydrogen, ammonia or methane, which may be diluted with a further gas, for example, nitrogen or argon. Alternatively or additionally the solid or liquid silica from which evaporation takes place can contain a solid or liquid reducing agent, for example, carbon. The use of a reducing agent in this way means that the vapor contains less than the stoichiometric quantity of oxygen and it is necessary to make good this deficiency by the introduction of oxygen or other gaseous oxidizing agent before the vapor is cooled to a temperature at which any substantial precipitation of solid occurs.

The use of hydrogen as reducing agent generates water vapor by the reduction of silica and more water vapor may be produced by oxidation of excess hydrogen at the quench stage.

Whether or not a reducing agent is used, it is preferred to use a cooling gas containing a gaseous oxidizing agent to ensure the substantial absence of lower oxides of silicon in the condensate. Air is, in any event, the quench gas most usually employed for economic reasons. Other gases can be used for quenching, however, including, for example, nitrogen, carbon dioxide, and the inert gases such as helium and argon.

As an alternative or in addition to generating water vapor in situ, water can be supplied as an entrainment in the quench gas, for example, as a saturated vapor or as an aerosol. Moreover, water vapor itself in the form of steam, optionally diluted, can be used as the quench gas.

Also part of the invention is an apparatus for the production of silica in finely divided form comprising a plasma generator, an axially symmetrical body having an axially extending open-ended passage therethrough wherein at least a lining to the passage comprises silica, the body being mounted for rotation about the axis and being disposed in relation to the plasma generator such that in operation a stream of hot gas from the plasma generator is directed into the passage, means for rotating the body, inlet means for introducing cooling gas into a hot gas stream issuing from the downstream end of the passage, and means, downstream of the inlet means, for separating finely divided silica from the gas stream.

Suitable bodies can be made from, for example, particulate forms of silica such as ground fused quartz or quartz sand by moulding a mixture of the particulate silica with a siliceous binding agent, for example, a hydrolyzed ethyl silicate or other such binding agent of the type commonly used in the production of refractory articles such as moulds for metal casting. After moulding the body, the binding agent is set or gelled and the body is fired to cement the particles and provide adequate mechanical strength.

The arrangement at the downstream end of the passage can be a tube, which may, for example be, air or water cooled, in alignment with the passage, the tube in turn leading to an electrostatic precipitator or bag filter. The cooling gas can be fed into the cooling tube through jets in the wall of the tube or through a gap between the tube and the downstream end of the passage. With this arrangement, some deposition of silica in finely divided form occurs in the tube, but most of the product is collected from the precipitator or filter.

The plasma generator may be of the DC nontransferred arc type or a radiofrequency plasma torch. In another arrangement, the molten silica may form the anode while the plasma generator is used in the "transferred arc" mode.

Good results have been obtained using argon-hydrogen or nitrogen-hydrogen plasmas. The plasma generator is usually started with a pure argon plasma since this gas ionizes very readily. To illustrate the range of working conditions, gas can be fed to the plasma generator at a rate of for example 50 to 150 liters (measured at NTP) per minute, and the power supplied to the generator can be from 15 to 40 kilowatts. The temperature of the plasma may be, for example, from 3,000° to 12,000° C. Rates of evaporation of from 10 to 40 grams per minute of silica have been obtained, giving a concentration of silica vapor in the gas stream of, for example, from 0.1 to 0.5 grams per liter. On leaving the furnace, the gas stream can be diluted with from 100 to 400 liters per minute (measured at NTP) of gas, usually air, or an equivalent volume of oxygen or oxygen-enriched air. The temperature of the quench gas before injection is usually ambient, but can be considerably below this, for example, as low as −180° C. where the gas is air.

The invention is illustrated by the following example.

EXAMPLE

The apparatus used is shown in diagrammatic section in the accompanying DRAWING, in which A is a plasma torch, B a centrifugal liquid wall furnace and C a cooling tube.

The apparatus also included an electrostatic precipitator (not shown) connected to the downstream end of the cooling tube.

The plasma torch includes a tungsten rod cathode 1, a copper anode comprising a cup 2 and a tubular stem 3, gas inlets 4 and 5 and a nozzle 6 having a radial bore 7. The furnace comprises a steel tube 8 surrounded by a jacket 9 through which water can be circulated. The tube is rotatable on bearings in an annular housing (not shown) at each end. A hollow cylindrical silica core 10 is mounted coaxially within the furnace, being held at the ends by guard rings 11 and 12. The cooling tube has a jacket 13 through which water can be circulated, and juxtaposed jets 14 for the introduction of quench gas into the interior of the tube. Quench gas can also be supplied at the gap 15 between the furnace and the cooling tube. A slight positive pressure of gas (flange bleed gas) is maintained at the gap 16 between the torch and the furnace.

As evaporation proceeds, a cavity 17 is formed in the core. The silica can be replenished by feeding silica in the form of rod, pellets or powder into the plasma via the bore 7.

In one series of experiments, the plasma consisted largely of argon with a small amount of hydrogen as shown in the Table 1 below. The condenser system was operated under a slight vacuum so that air was drawn in through the inlets in sufficient quantity to oxidize completely silicon monoxide and hydrogen in the furnace exit gases. Some silica condensed in the water-cooled tube, but most was collected in the electrostatic precipitator. The data given in Table 1 represent operation under nonoptimum conditions.

TABLE I

| Exp. No. | Total time, min. | Torch gasses Ar | Torch gasses $H_2$ | Approx. torch power, kw. | Flange Ar | Product A | Product B | Total |
|---|---|---|---|---|---|---|---|---|
| 1 | 95 | 54 | 5.8 | 15.8 | 8 | 26.9 | 23.5 | 50.4 |
| 2 | 90 | 54 | 5.8 | 15.7 | 8 | 10.8 | 14.4 | 35.2 |
| 3 | 120 | 54 | 5.8 | 16.0 | 4 | 16.0 | 28.7 | 44.7 |
| 4 | 110 | 54 | 5.8 | 15.6 | 8 | 19.1 | 23.1 | 42.2 |
| 5 | 75 | 54 | 5.8 | 15.5 | 8 | | 22.2 | |

NOTE.—Gas flows in litres/minute at S.T.P. Product collected (g.): A, in condenser; B, in precipitator.

The products were evaluated as thickening and thixotropic agents in two polyester resin samples in comparison with a commercially available silica believed to be made by an electric arc process but under otherwise unknown process conditions. The viscosities of 2 percent by weight dispersions of silica in the resin were measured after blending and standing for 24 hours, using a Brookfield viscometer. Results are given in Table 2 below.

TABLE 2.—Viscosity in centipoise

| | Resin I | | | Resin II | | |
|---|---|---|---|---|---|---|
| R.p.m. | 20 | 10 | 5 | 20 | 10 | 5 |
| Exp. No.: | | | | | | |
| 1 | 1,400 | 2,040 | 2,960 | | | |
| 2 | 2,400 | 3,580 | 5,120 | 5,000 | 6,880 | 9,640 |
| 3 | 2,180 | 3,140 | 4,800 | 4,410 | 6,060 | 8,560 |
| 4 | 1,850 | 2,700 | 4,000 | 4,130 | 5,700 | 8,000 |
| 5 | 2,230 | 3,300 | 5–040 | 4,730 | 6,680 | 9,600 |
| Electric arc | 1,680 | 1,820 | 2,290 | 800 | 1,080 | 1,440 |

The superiority of the silicas produced by the present process as thickening and thixotropic agents compared with the commercially available silica is clearly shown.

In a second series of experiments, the plasma torch was fed with various mixtures of argon and hydrogen or (after starting the torch with argon) nitrogen and hydrogen. To prevent attack of the tungsten cathode by nitrogen, the nitrogen was fed tangentially into the arc chamber while hydrogen (or argon) was fed axially along the cathode, thus shielding the tungsten with an inert layer. A larger condenser and precipitator system than used for the first series of experiments was installed, and the system also included a tube fitted with baffles downstream from the electrostatic precipitator, resulting in more efficient collection of the product. The power supplied to the torch was higher, giving higher rates of evaporation of silica.

Air, oxygen or a mixture of the two was injected into the condenser through the juxtaposed jets.

The experimental data are down in Table 3 below:

In further series of experiments, the effect on the thickening power of the product of varying the volume of quench gas relative to the volume of plasma was studied. The results given in Table 5 were obtained when the quench gas was introduced through juxtaposed jets, and those in Table 6 were obtained by introducing the quench gas through the gap 15 (see drawing). This resulted in a radial flow of quench gas into the hot efflux from the furnace.

TABLE 3

| Expt. No. | Total time, min. | Torch gases Ar | Torch gases $H_2$ | Torch gases $N_2$ | Approximate torch power, kw. | Flange Ar | Flange $H_2$ | Quench Air | Quench $O_2$ | Product (g.) A | Product (g.) B | Product (g.) C | Total | Core loss (g.) | Initial diameter of core (mm.) |
|---|---|---|---|---|---|---|---|---|---|---|---|---|---|---|---|
| 6 | 20 | 40 | 40 | | 27.3 | | 2.2 | 160 | | 116.5 | 145 | | 261.5 | | 33 |
| 7 | 22 | 9 | 60 | | 26.6 | | 2.2 | | 70 | 172 | 43.5 | | 215.5 | 315 | 33 |
| 8 | 16 | 40 | 40 | | 27.1 | | 2.2 | 160 | | 149 | 156 | 25 | 330 | 385 | 27 |
| 9 | 20 | 40 | | 69 | 30.1 | | | 160 | | 15 | 48 | 4 | 67 | 91 | 27 |
| 10 | 14 | | 54 | 70 | 30.4 | 2.8 | | 160 | 17 | 98.5 | 164 | | 262.5 | 351 | 27 |

NOTE.—Gas flows in litres/minute at S.T.P. Product collected: A, in condenser; B, in precipitator.

The course of experiment No. 8 is shown in greater detail in Table 4

| Time | Torch Ar | Torch $H_2$ | Kw. | Flange $H_2$ | Heat out to cooling water (kw.)* 1 | 2 | 3 | 4 | Precipitator temperature (° C.) Jacket | Exit | Air quench |
|---|---|---|---|---|---|---|---|---|---|---|---|
| 0 | 40 | | 5.8 | 2.2 | | | | | | | 160 |
| 0 | 40 | 40 | 27.3 | 2.2 | | | | | | | 160 |
| 5 | 40 | 40 | 27.2 | 2.2 | 2.32 | 7.3 | 0.82 | 10.73 | | 65 | 160 |
| 10 | 40 | 40 | 27.1 | 2.2 | 3.32 | 7.25 | 7.35 | 11.20 | 264 | 67 | 160 |
| 15 | 40 | 40 | 26.7 | 2.2 | 3.32 | 7.25 | 9.43 | 10.68 | 320 | 69 | 160 |

*This includes heat due to combustion of $H_2$ = 7.2 kw.
1 = Heat lost to cathode.   2 = Heat lost to anode.   3 = Heat lost to furnace.   4 = Heat lost to condenser.

NOTE.—Gas flows in litres/minute at S.T.P.

The results given in Table 7 were obtained using juxtaposed jets for the introduction of the quench gas but a silica core of modified design containing natural silica sand such that a longer cavity was burned in the tube. This effectively increased the temperature of the exit gases and a more rapid rate of fall in temperature of the gases on quenching was therefore achieved. The product had exceptionally good thickening power. The increase in thickening power with increased dilution and hence cooling of the plasma is apparent from a comparison of Experiment 14 with Experiment 15, although the oxygen present was in each case sufficient to oxidize all the silicon monoxide and hydrogen in the plasma.

TABLE 5

| Expt. No. | Duration, mins. | Torch gas, litres/min. | | Power, k'watt | Quench (l./min.) | | $SiO_2$ vapourised, g. | Thickening power, cps. | |
|---|---|---|---|---|---|---|---|---|---|
| | | $H_2$ | $N_2$ | | Air | $O_2$ | | Speed 2 | Speed 3 |
| 11 | 16 | 26 | 45 | 25.0 | 0 | 26 | 131 | | 83 |
| 12 | 15 | 26 | 45 | 25.2 | 140 | 0 | 178 | | 81 |
| 13 | 12 | 26 | 45 | 25.2 | 280 | 0 | 155 | 105 | |

TABLE 6

| 14 | 14 | 26 | 45 | 24.8 | 140 | 0 | 140 | 104 | |
| 15 | 10.8 | 26 | 45 | 25.1 | 0 | 20 | ~110 | 89 | |

TABLE 7

| 16 | 15 | 26 | 45 | 25.2 | 140 | 0 | ~240 | 112 | |
| 17 | 14 | 26 | 45 | 30.0 | 140 | 0 | 282 | 112 | |

NOTES ON TABLES.—(a) Thickening power: this is a screening test based on the viscosity of a 1% w./w. dispersion of the $SiO_2$ in tri-tolyl phosphate. The viscosity was measured on a Ferranti Viscometer, VMA spindle, speeds 2 or 3. Tri-tolyl phosphate itself had a viscosity of 78 cps. at speed 2 and 75 cps. at speed 3, and a 1% dispersion of a commercially available thickening silica had a viscosity of 87 cps. at speed 2 and a viscosity of 88 cps. at speed 3.

What is claimed is:

1. A process for the production of silica in finely divided form which comprises (1) directing a stream of hot gas from a plasma generator into a rotating, hollow, axially symmetrical, thick, solid body of silica in form of a core to thereby form a molten zone of silica generally along the axis of rotation of said body from which evaporation of silica occurs into said stream, said body having an axially extended open-ended passage and said body being one from which a high rate of evaporation is obtained until a substantial, elongated cavity is formed in said core, said molten zone of silica being formed along the walls of the passage and being held in place by centrifugal force as result of rotating body of silica, (2) quenching the stream containing the vaporized silica by a cooling gas to condense the vaporized silica and (3) separating the condensed silica from the stream whereby silica in finely divided form is obtained.

2. A process according to claim 1 in which the cooling gas contains water vapor.

3. A process according to claim 2 in which the cooling gas is introduced into the hot gas at a flow rate of at least half that of the hot gas.

4. A process according to claim 3 in which the flow rate of the cooling gas is from 10 to 20 times that of the hot gas.

* * * * *